(12) United States Patent
Jiang et al.

(10) Patent No.: US 12,455,815 B2
(45) Date of Patent: Oct. 28, 2025

(54) MEMORY STATE RECOVERY METHOD FOR NO-MMU ENVIRONMENT IN EMULATED CPU CHIP ACCELERATION

(71) Applicant: Suzhou Ricore IC Technologies Ltd., Jiangsu (CN)

(72) Inventors: Zhiying Jiang, Jiangsu (CN); Fei Wang, Jiangsu (CN); Dongrui Fan, Jiangsu (CN)

(73) Assignee: Suzhou Ricore IC Technologies Ltd., Jiangsu (CN)

( * ) Notice: Subject to any disclaimer, the term of this patent is extended or adjusted under 35 U.S.C. 154(b) by 0 days.

(21) Appl. No.: 18/696,556

(22) PCT Filed: Aug. 11, 2022

(86) PCT No.: PCT/CN2022/111684
§ 371 (c)(1),
(2) Date: Mar. 28, 2024

(87) PCT Pub. No.: WO2023/206859
PCT Pub. Date: Nov. 2, 2023

(65) Prior Publication Data
US 2024/0385956 A1    Nov. 21, 2024

(30) Foreign Application Priority Data
Apr. 24, 2022 (CN) .......................... 202210435456.5

(51) Int. Cl.
*G06F 12/02* (2006.01)
(52) U.S. Cl.
CPC .................. *G06F 12/023* (2013.01)
(58) Field of Classification Search
CPC .................. G06F 12/0246; G06F 12/023
(Continued)

(56) References Cited

U.S. PATENT DOCUMENTS

| 6,105,129 A * | 8/2000 | Meier ................. G06F 9/30185 712/225 |
| 2006/0107259 A1* | 5/2006 | Lin ....................... G06F 13/102 717/169 |

(Continued)

FOREIGN PATENT DOCUMENTS

| CN | 101246427 A | 8/2008 |
| CN | 102169459 A | 8/2011 |

(Continued)

OTHER PUBLICATIONS

International Search Report (English and Chinese) filed in PCT/CN2022/111684 filed Nov. 1, 2022, 6 pages.

(Continued)

*Primary Examiner* — Jared I Rutz
*Assistant Examiner* — Edward Waddy, Jr.
(74) *Attorney, Agent, or Firm* — Rankin, Hill & Clark LLP

(57) ABSTRACT

A memory state recovery method for a no-MMU environment in emulated CPU chip acceleration includes relocation of a virtual memory area, which involves performing relocation on each virtual memory area in an available physical memory space, converting a base address, which is represented by a virtual address of the virtual memory area, into a physical address, and keeping the length of the address unchanged. The method also includes recovery of memory access data, wherein for each memory access read record, a recovery rule for a storage position is the base address after relocation of the virtual memory area plus an offset; recovery of a stack state, wherein for each stack frame, a recovery rule for a storage position is the base address after relocation of the virtual memory area plus an offset; and recovery of the value of a general register.

8 Claims, 4 Drawing Sheets

(58) Field of Classification Search
USPC .................. 711/154, E12.001, E12.002, 170
See application file for complete search history.

(56) References Cited

U.S. PATENT DOCUMENTS

| | | |
|---|---|---|
| 2017/0199835 A1* | 7/2017 | Kim .......................... G06T 1/20 |
| 2017/0242590 A1* | 8/2017 | Gokhale ............. G06F 12/0223 |
| 2019/0036173 A1 | 1/2019 | Tojigamori et al. |
| 2019/0361730 A1* | 11/2019 | Xie ..................... G06F 12/0802 |
| 2020/0004688 A1 | 1/2020 | Brigg et al. |

FOREIGN PATENT DOCUMENTS

| CN | 102567126 A | 7/2012 |
|---|---|---|
| CN | 103870767 A | 6/2014 |
| CN | 107729085 A | 2/2018 |
| CN | 112035272 A | 12/2020 |
| CN | 113849339 A | 12/2021 |
| CN | 114138689 A | 3/2022 |
| CN | 114781322 A | 7/2022 |

OTHER PUBLICATIONS

Chinese First Office Action of CN202210435456.5 dated Jan. 19, 2023, 6 pages.

* cited by examiner

MEMORY STATE RECOVERY METHOD FOR NO-MMU ENVIRONMENT IN EMULATED CPU CHIP ACCELERATION

TECHNICAL FIELD

The present disclosure relates to a memory state recovery method, in particular to a memory state recovery method and device for an MMU-free environment in an acceleration of CPU chip simulation.

BACKGROUND

As shown in FIG. 1, in the field of processor design, it is necessary to analyze and evaluate a running effect of a specific application on a designed processor based on a simulation platform.

Slicing an application is to extract instruction fragments with a high proportion according to a running state of the application, together with the required running state, mainly including register value and memory states. The purpose of the sliced application is to run on a specific processor design instance in the simulation platform to obtain an evaluation result of the design so as to guide processor design. Compared with running a complete application, running an application slice can significantly shorten simulation time and speed up processor design while paying attention to application load characteristics.

As shown in FIG. 2, a memory management unit (MMU) is briefly introduced. The MMU is an intermediate layer between a processor and an off-chip memory, which provides conversion from a virtual address (VA) to a physical address (PA), and is generally encapsulated inside a CPU chip. Therefore, the VA generally only exists inside a CPU.

Without considering TLB and multi-level page tables, conversion may be simply shown in FIG. 3.

SUMMARY

Problem to be Solved by Invention

The main object of the present disclosure is to provide a memory state recovery method for an MMU-free environment in the acceleration of CPU chip simulation to solve the problem of memory state recovery in an MMU-free environment.

Solution to Problem

In order to achieve the above object, the present disclosure provides a memory state recovery method for an MMU-free environment in an acceleration of CPU chip simulation, including following steps:
  Step S1: relocating Virtual Memory Areas (VMA), including: relocating each VMA in an available physical memory space, converting a base address represented by a virtual address of the VMA into a physical address, with a length remains unchanged;
  Step S2: recovering memory access data, wherein a recovery rule of a storage location for each read memory access record from the recovered memory access data is: the base address of the relocated VMA+offset;
  Step S3: recovering stack states, wherein a recovery rule of a storage location for each stack frame is: the base address of the relocated VMA+offset; and
  Step S4: recovering general register values.

Preferably, the step S1 includes:
  Step S11: determining a starting address of a physical memory in a target system environment;
  Step S12: taking an area starting from the starting address as an area of a stack type; and
  Step S13: taking an end of a previous area as a beginning of a next area, and allocating a heap type and a normal type in order.

Preferably, the step S2 includes:
  S21: if a value from the memory access data belongs to the range of a certain original virtual memory domain, determining that the value is a memory address, and the value is: the base address of the relocated VMA+offset;
  S22: if the value from the memory access data is equal to a certain jump address, determining as that the value is a memory address, and the value is: an address of a corresponding symbol;
  S23: otherwise, determining the value from the memory access data is a piece of normal data, and the value remains unchanged.

Preferably, the step S3 includes:
  Step S31: if the stack frame is in a Return Address (RA) location, determining that a value of the stack frame is a jump address, and the value is: an address of a corresponding symbol;
  Step S32: if the stack frame is in a Frame Pointer (FP) location, determining that the value of the stack frame is a VMA0 address, and the value is: a base address of the relocated VMA0+offset;
  Step S33: if the stack frame is in another location and the value of the stack frame belongs to the range of a certain original VMA, determining that the value is a memory address, and the value is: the base address of the relocated VMA+offset;
  Step S34: if the stack frame is in another location and the value of the stack frame is equal to a certain jump address, determining that the value is a memory address, and the value is: an address of a corresponding symbol;
  Step S35: otherwise, determining the value of the stack frame is a piece of normal data, and the value remains unchanged.

Preferably, the step S4 includes:
  S41: if a value from the general register values belongs to the range of a certain original VMA, determining that the value is a memory address, and the value is: the base address of the relocated VMA+offset;
  S42: if the value from the general register values is equal to a certain jump address, determining that the value is a memory address, and the value is: an address of a corresponding symbol;
  S43: otherwise, determining the value from the general register values is a piece of normal data, and the value remains unchanged.

In order to achieve the above object, the present disclosure further provides a memory state recovery device for an MMU-free environment in an acceleration of CPU chip simulation, including:
  a VMA relocation unit configured to relocate each VMA in an available physical memory space, and convert a base address represented by a virtual address of the VMA into a physical address, with a length remains unchanged;
  a memory access data recovery unit configured to recover memory access data, wherein a recovery rule of a storage location for each read memory access record from the recovered memory access data is: the base address of the relocated VMA+offset;

a stack state recovery unit configured to recover stack states, wherein a recovery rule of a storage location for each stack frame is: the base address of the relocated VMA+offset; and a general register value recovery unit configured to recover general register values.

In order to achieve the above object, the present disclosure further provides an electronic device, including a memory and a processor, where the memory stores a computer program, and the processor, in response to executing the computer program, implements the steps of any one of the above methods.

In order to achieve the above object, the present disclosure further provides a computer-readable storage medium storing a computer program, where the computer program, in response to being executed by a processor, causes the processor to implement the steps of any one of the above methods.

Effects of Invention

Compared with the existing technology, the present disclosure has the following beneficial effects:

One of the key technologies involved in running application slicing is memory state recovery. Different methods are adopted depending on whether a target processor has an MMU. In the present disclosure, in the case where there is no MMU, a memory address used by a processor is a physical address of a memory, which is simpler than the case where there is an MMU. The present disclosure is characterized by the use of physical addresses after recovery.

DETAILED DESCRIPTION

Figure 1:
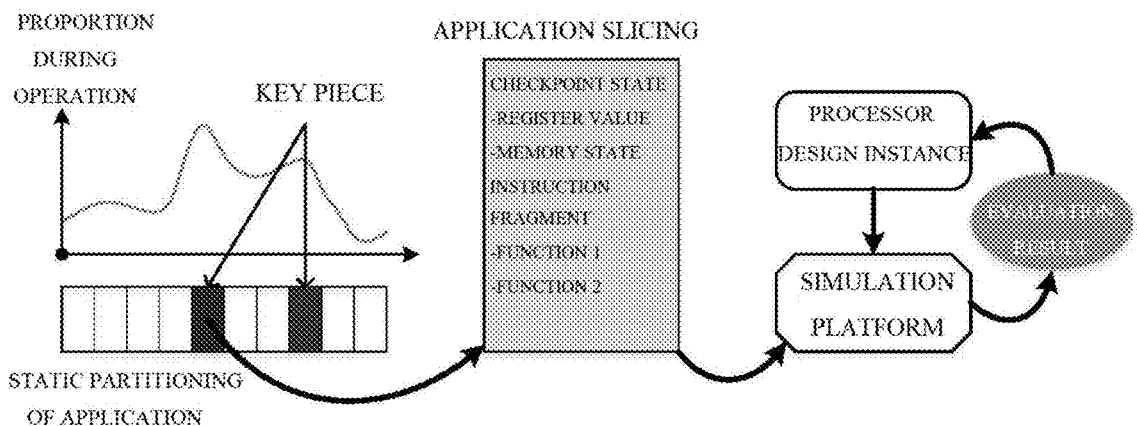
FIG. 1 is a schematic diagram of the role of an application slice in processor design in the existing technology.
Figure 2:
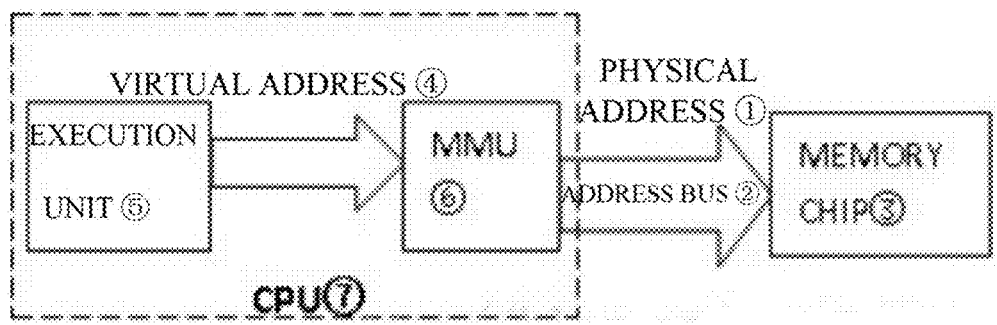
FIG. 2 is a schematic diagram of the functions of a memory management unit (MMU) in the existing technology.
Figure 3:
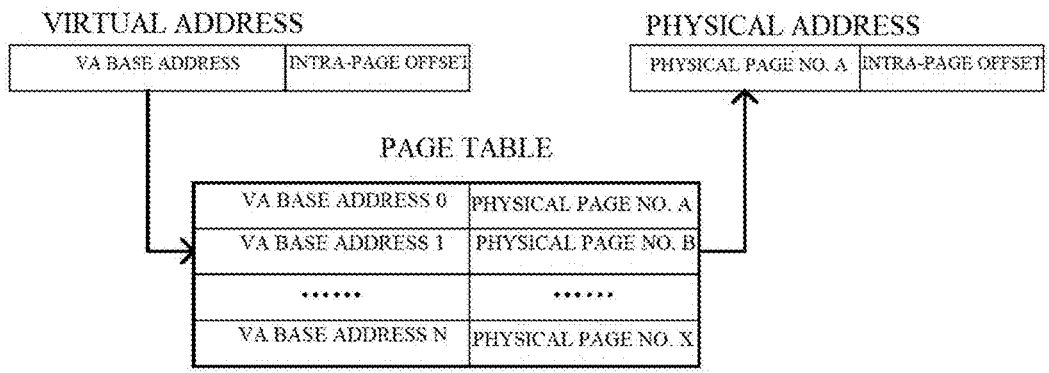
FIG. 3 is a schematic diagram of conversion from a virtual address to a physical address in the existing technology.

The technical schemes in the embodiments of the present disclosure will be clearly and completely described below with reference to the figures in the embodiments of the present disclosure. Obviously, the described embodiments are only some of, not all of, the embodiments of the present disclosure. All other embodiments obtained by those having ordinary skill in the art based on the embodiments of the present disclosure without creative effort shall fall within the scope of protection of the present disclosure. Moreover, it needs to be further emphasized here that the following specific embodiments provide preferred technical schemes, and all schemes (embodiments) may be used in conjunction with or in combination with each other.

First, an application slice in the present disclosure is described. The application slice consists of instruction fragments and checkpoint information.

Tables 1-5 show complete information of a certain application slice, that is, the known conditions before memory recovery. Table 1 shows example-instruction fragment, Table 2 shows example-program jump, Table 3 shows example-register state, Table 4 shows example-VMA list, Table 5 shows example-memory access data, and Table 6 shows example-stack.

TABLE 1

| Example-instruction fragment |
|---|
| main: |
| addi sp, sp, −32 |
| sd ra, 24(sp) |
| main__48: |
| ld a4, −952(gp) |
| lw a5, −20(s0) |
| towers: |
| addi sp, sp, −32 |
| sd ra, 24(sp) |
| towers__84: |
| lw a5, −20(s0) |
| addiw a5, a5, −1 |
| towers__120: |
| ld a5, −952(gp) |
| addi a4, a5, 1 |
| towers__168: |
| ld ra, 24(sp) |
| ld s0, 16(sp) |

TABLE 2

| Example-program jump | |
|---|---|
| Target address (virtual address) | Corresponding symbols |
| 0x10588 | towers__84 |
| 0x105ac | towers__120 |
| 0x105dc | towers__168 |

TABLE 3

| Example-register state | |
|---|---|
| Serial number | Values |
| 0 | 0x0 |
| 1 | 0x105dc |
| 2 | 0x7ffffffffffb20 |
| 3 | 0x81110 |
| 4 | 0x83710 |
| 5 | 0x82000 |
| 6 | 0x2f2f2f2f2f2f2f2f |
| 7 | 0x82000 |
| 8 | 0x7ffffffffffb40 |
| 9 | 0x10d3c |

TABLE 3-continued

Example-register state

| Serial number | Values |
|---|---|
| 10 | 0x1 |
| 11 | 0x41 |
| 12 | 0x42 |
| 13 | 0x43 |
| 14 | 0x7f |
| 15 | 0x7e |
| 16 | 0x81238 |
| 17 | 0xe62f464041414e47 |
| 18 | 0x0 |
| 19 | 0x0 |
| 20 | 0x0 |
| 21 | 0x0 |
| 22 | 0x0 |
| 23 | 0x0 |
| 24 | 0x0 |
| 25 | 0x0 |
| 26 | 0x0 |
| 27 | 0x0 |
| 28 | 0xffffffffffffffff |
| 29 | 0x3 |
| 30 | 0x9f |
| 31 | 0x0 | wherein checkpoint information specifically includes:
1. VMA list: type, starting address, length
2. Memory access data: address, data
3. Stack content: several stack frames
4. Program jump: target address, corresponding symbols
5. General register: the contents of some registers are memory addresses

TABLE 4

Example-VMA list

| Serial number | Type | Starting address (virtual address) | Length |
|---|---|---|---|
| 0 | stack | 0x7ffffffff800000 | 0x800000 |
| 1 | heap | 0x83000 | 0x1000 |
| 2 | heap | 0x84000 | 0x21000 |
| 3 | normal | 0x80000 | 0x1000 |

TABLE 5

Example-memory access data

| Original address (virtual address) | Data |
|---|---|
| 0x80d58 | 0x7f |
| 0x7ffffffffffb30 | 0x7ffffffffffb60 |
| 0x7ffffffffffb38 | 0x105dc |

TABLE 6

Example-stack
stack-base = 0x7fffffffffffffff
stack-top = 0x7ffffffffffb20
frame-pointer = 0x7ffffffffffb40

| | | Original address (virtual address) | Data |
|---|---|---|---|
| top | frame 0 | 0x7ffffffffffb20 | 0x0 |
| | | 0x7ffffffffffb28 | 0x141424300 |
| | | 0x7ffffffffffb30 | 0x7ffffffffffb60 |
| | | 0x7ffffffffffb38 | 0x105dc |

TABLE 6-continued

Example-stack
stack-base = 0x7fffffffffffffff
stack-top = 0x7ffffffffffb20
frame-pointer = 0x7ffffffffffb40

| | | Original address (virtual address) | Data |
|---|---|---|---|
| | frame 1 | 0x7ffffffffffb40 | 0x5c |
| | | 0x7ffffffffffb48 | 0x243424177 |
| | | 0x7ffffffffffb50 | 0x7ffffffffffb80 |
| | | 0x7ffffffffffb58 | 0x105dc |
| | frame 3 | 0x7ffffffffffb60 | 0x5b |
| | | 0x7ffffffffffb68 | 0x341424377 |
| | | 0x7ffffffffffb70 | 0x7ffffffffffba0 |
| | | 0x7ffffffffffb78 | 0x105dc |
| ... | ... | ... | ... |
| base | | 0x7ffffffffffff0 | 0x8505406704f2b540 |

Figure 4:
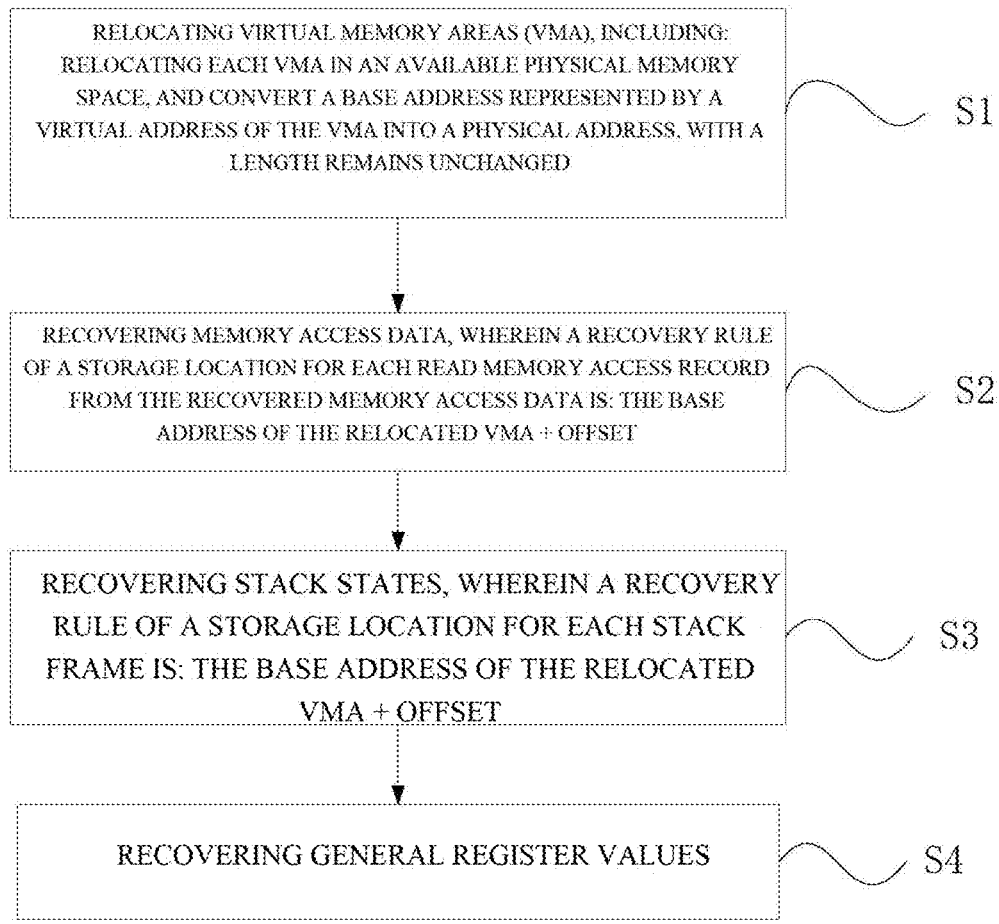
FIG. 4 is a flow chart of a memory state recovery method for an MMU-free environment in an acceleration of CPU chip simulation of the present disclosure.
Figure 5:
FIG. 5 is a schematic diagram of a memory area allocation (relocation) method of the present disclosure.

FIG. 4 shows a flow chart of a memory state recovery method for an MMU-free environment in an acceleration of CPU chip simulation of the present disclosure. The memory state recovery method for an MMU-free environment in the acceleration of CPU chip simulation of the present disclosure includes following steps:

In a step of S1, Virtual Memory Areas (VMA) are relocated including: relocating each VMA in an available physical memory space, and converting a base address represented by a virtual address of the VMA into a physical address, with a length remains unchanged. The step S1 specifically includes following sub-steps, and FIG. 5 shows a memory area allocation (relocation) method:

In a step of S11, a starting address of a physical memory in a target system environment is determined;

In a step of S12, an area starting from the starting address is taken as an area of a stack type; and In a step of S13, the end of the previous area is taken as the beginning of a next area, and a heap type and a normal type are allocated in order.

A specific example of the step is as follows:

VMA list relocation result (physical memory starting address=0x000000)

| Serial number | Type | Starting address (virtual address) | Length | Relocated to (physical address/base address) |
|---|---|---|---|---|
| 0 | stack | 0x7ffffffff800000 | 0x800000 | 0x000000 |
| 1 | heap | 0x83000 | 0x1000 | 0x800000 |
| 2 | heap | 0x84000 | 0x21000 | 0x801000 |
| 3 | normal | 0x80000 | 0x1000 | 0x822000 |

In a step of S2, memory access data is recovered. In this step S2, a recovery rule of a storage location for each read memory access record from the recovered memory access data is: the base address of the relocated VMA+offset. In this step, a recovery rule of a memory value includes following steps:

In a step of S21, if a value from the memory access data belongs to the range of a certain original VMA, it is determined that the value is a memory address, and the value is: the base address of the relocated VMA+offset;

In a step of S22, if the value from the memory access data is equal to a certain jump address, it is determined that the value is a memory address, and the value is an address of a corresponding symbol In a step of S23, otherwise, it is determined the value from the memory access data is a piece of normal data, and the value remains unchanged.

An example of the step is as follows:

Example—Memory Access Data

| Original address (virtual address) | Data | Storage location | Data attributes | Values after recovery |
|---|---|---|---|---|
| 0x80d58 | 0x7f | VMA3 | Normal data | Remaining unchanged |
| 0x7fffffffffffb30 | 0x7fffffffffffb60 | VMA0 | VMA0 address | Base address of VMA0 + offset, that is: 0x00000 + 0x7ffb60 |
| 0x7fffffffffffb38 | 0x105dc | VMA0 | Jump address | Symbol address, that is: towers_168 address |

In a step of S3, stack states are recovered. In this step, a recovery rule of a storage location for each stack frame is: the base address of the relocated VMA+offset; a recovery rule of a memory value includes following steps:

In a step of S31, if the stack frame is in a Return Address (RA) location (the last 64 Byte in the stack frame), it is determined that the value of the stack frame as is a jump address, the value is an address of a corresponding symbol;

In a step of S32, if the stack frame is in a Frame Pointer (FP) location (the penultimate 64 Byte in the stack frame), it is determined that the value of the stack frame jump address, it is determined that the value is a memory address, and the value is an address of a corresponding symbol.

In a step of S35, otherwise, it is determined the value of the stack frame is a piece of normal data, and the value remains unchanged.

An example of the above steps is as follows:

Example—Stack stack-base=0x7fffffffffffffff relocated to 0x800000-1 stack-top=0x7fffffffffffb20 relocated to 0x7ffb20 frame-pointer=0x7ffffffffffffb40 relocated to 0x7ffb40

FP=frame-pointer, RA=return-address

| | | Original address (virtual address) | Data | Data attributes | Values after recovery |
|---|---|---|---|---|---|
| top | frame 0 | 0x7fffffffffffb20 | 0x0 | Normal data | Remaining unchanged |
| | | 0x7fffffffffffb28 | 0x141424300 | Normal data | Remaining unchanged |
| | | 0x7fffffffffffb30 | 0x7fffffffffffb60 | FP, VMA0 address | Base address of VMA0 + offset, that is: 0x00000 + 0x7ffb60 |
| | | 0x7fffffffffffb38 | 0x105dc | RA, jump address | Symbol address, that is: towers_168 address |
| | frame 1 | 0x7fffffffffffb40 | 0x5c | Normal data | Remaining unchanged |
| | | 0x7fffffffffffb48 | 0x243424177 | Normal data | Remaining unchanged |
| | | 0x7fffffffffffb50 | 0x7fffffffffffb80 | FP, VMA0 address | Base address of VMA0 + offset, that is: 0x00000 + 0x7ffb80 |
| | | 0x7fffffffffffb58 | 0x105dc | RA, jump address | Symbol address, that is towers_168 address |
| | frame 3 | 0x7fffffffffffb60 | 0x5b | Normal data | Remaining unchanged |
| | | 0x7fffffffffffb68 | 0x84210 | VMA2 address | VMA2 base address + offset, that is: 0x801000 + 0x210 |
| | | 0x7fffffffffffb70 | 0x7fffffffffffba0 | FP, VMA0 address | Base address of VMA0 + offset, that is: 0x00000 + 0x7ffba0 |
| | | 0x7fffffffffffb78 | 0x105ac | RA, jump address | Symbol address, that is towers_120 address |
| | ... | ... | ... | ... | ... |
| base | | 0x7ffffffffffff0 | 0x8505406704f2b540 | Normal data | Remaining unchanged | is a VMA0 address, and the value is: a base address of the relocated VMA0+offset;

In a step of S33, if the stack frame is in another location and the value of the stack frame belongs to the range of a certain original VMA, it is determined that the value is a memory address, and the value is: the base address of the relocated VMA+offset;

In a step of S34, if the stack frame is in another location and the value of the stack frame is equal to a certain In a step of S4, general register values are recovered.

For each general register, the value recovery rule is the same as that in S2. In this step, a recovery rule of a memory value includes following steps:

In a step of S41, if a value from the general register values belongs to the range of a certain original VMA, it is determined that the value is a memory address, the value is: the base address of the relocated VMA+offset;

In a step of S42, if the value from the general register values is equal to a certain jump address, it is determined that the value is a memory address, and the value is an address of a corresponding symbol;

In a step of S43, otherwise, it is determined the value from the general register values is a piece of normal data, and the value remains unchanged.

An example of the above steps is as follows:

Example—Register State

| Serial number | Data/value | Data attributes | Recovery method |
|---|---|---|---|
| 0 | 0x0 | Normal data | Remaining unchanged |
| 1 | 0x105dc | Jump address | Symbol address, that is: towers_168 address |
| 2 | 0x7ffffffffffffb20 | VMA0 address | Base address of VMA0 + offset, that is: 0x00000 + 0x7ffb20 |
| 3 | 0x81110 | Normal data | Remaining unchanged |
| 4 | 0x83710 | VMA1 address | Base address of VMA1 + offset, that is: 0x800000 + 0x710 |
| 5 | 0x82000 | Normal data | Remaining unchanged |
| 6 | 0x2f2f2f2f2f2f2f2f | Normal data | Remaining unchanged |
| 7 | 0x82000 | Normal data | Remaining unchanged |
| 8 | 0x7ffffffffffffb40 | VMA0 address | Base address of VMA0 + offset, that is: 0x00000 + 0x7ffb40 |
| 9 | 0x10d3c | Normal data | Remaining unchanged |
| ... | ... | ... | ... |

Figure 6:
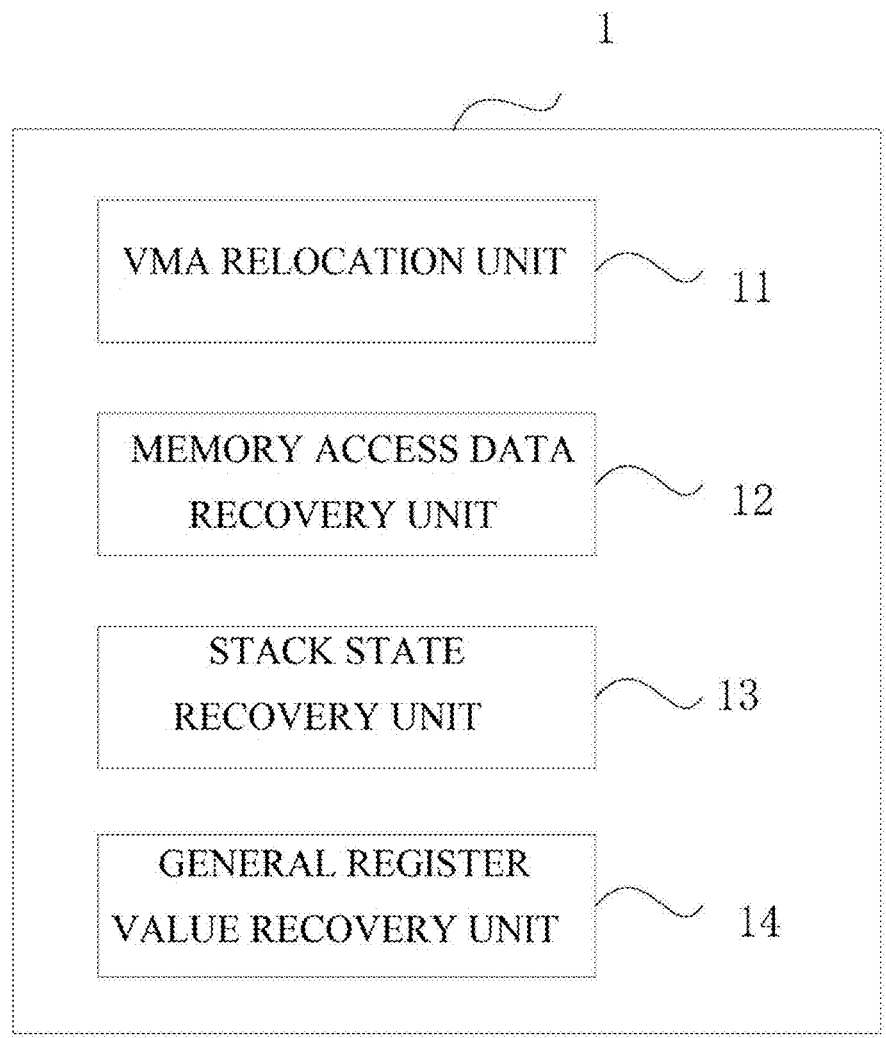
FIG. 6 is a block diagram of a memory state recovery device for an MMU-free environment in the acceleration of CPU chip simulation of the present disclosure.

FIG. 6 shows a memory state recovery device for an MMU-free environment in an acceleration of CPU chip simulation of the present disclosure. The device 1 specifically includes:

a VMA relocation unit 11 configured to relocate each VMA in an available physical memory space, and convert a base address represented by a virtual address of the VMA into a physical address, with a length remains unchanged;

a memory access data recovery unit 12 configured to recover memory access data, wherein a recovery rule of a storage location for each read memory access record from the recovered memory access data is: the base address of the relocated VMA+offset;

a stack state recovery unit 13 configured to recover stack states, wherein a recovery rule of a storage location for each stack frame is: the base address of the relocated VMA+offset; and a general register value recovery unit 14 configured to restore general register values.

Wherein the VMA relocation unit 11 includes:

determining a starting address of a physical memory in a target system environment; taking an area starting from the starting address as an area of a stack type; and taking an end of a previous area as a beginning of a next area, and allocating a heap type and a normal type in order.

The memory access data recovery unit 12 specifically includes: if a value from the memory access data belongs to the range of an original VMA, determining that the value is a memory address, and the value is: the base address of the relocated VMA+offset; if the value from the memory access data is equal to a certain jump address, determining that the value is a memory address, and the value is an address of a corresponding symbol; otherwise, determining the value from the memory access data is a piece of normal data, and the value remains unchanged.

The stack state recovery unit 13 specifically includes: if the stack frame is in a Return Address (RA) location (the last 64 Byte in the stack frame), determining that the value of the stack frame is a jump address, and the value is an address of a corresponding symbol; if the stack frame is in a Frame Pointer (FP) location (the penultimate 64 Byte in the stack frame), determining that the value of the stack frame is a VMA0 address, and the value is: a base address of the relocated VMA0+offset; if the stack frame is in another location and the value of the stack frame belongs to the range of a certain original VMA, determining that the value is a memory address, and the value is: the base address of the relocated VMA+offset; if the stack frame is in another location and the value of the stack frame is equal to a certain jump address, determining that the value is a memory address, and the value is an address of a corresponding symbol; otherwise, determining the value of the stack frame is a piece of normal data, and the value remains unchanged.

The general register value recovery unit 14 specifically includes: if a value from the general register values belongs to the range of a certain original VMA, determining that the value is a memory address, and the value is: the base address of the relocated VMA+offset; if the value from the general register values is equal to a certain jump address, determining that the value is a memory address, and the value is an address of a corresponding symbol; otherwise, determining the value from the general register values is a piece of normal data, and the value remains unchanged.

Compared with the existing technology, the present disclosure has the following beneficial effects:

One of the key technologies involved in running application slicing is memory state recovery. Different methods are adopted depending on whether a target processor has an MMU. In the present disclosure, in the case where there is no MMU, a memory address used by a processor is a physical address of a memory, which is simpler than the case where there is an MMU. The present disclosure is characterized by the use of physical addresses after recovery.

Figure 7:
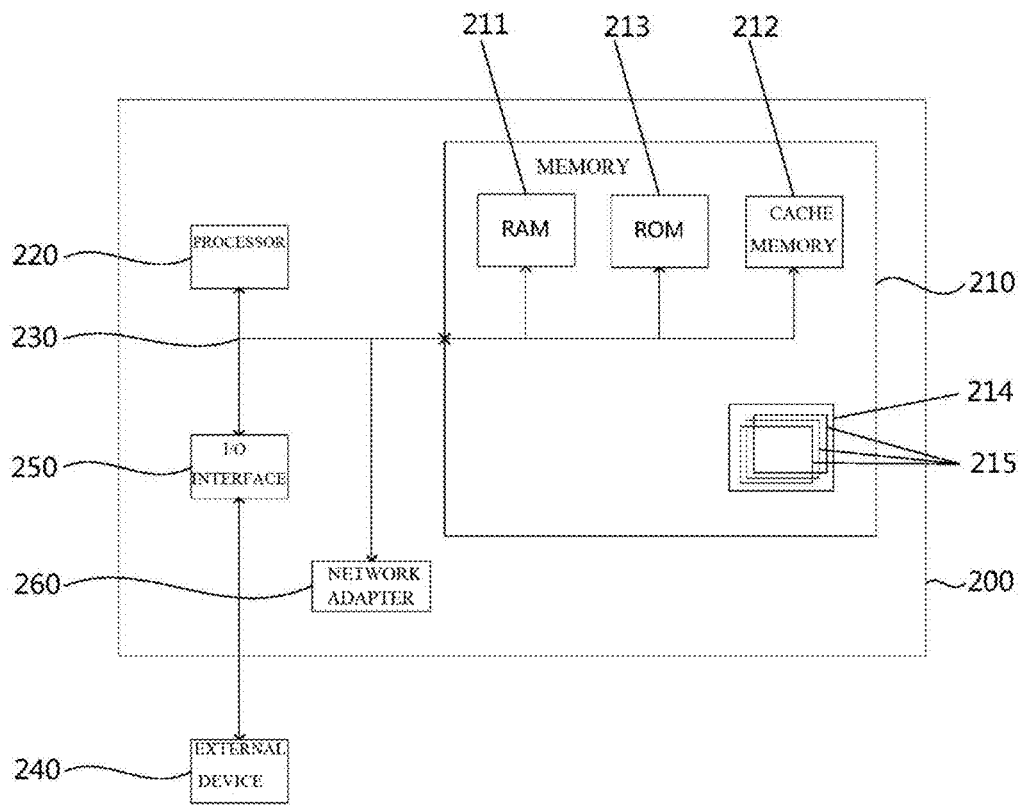
FIG. 7 is a structural schematic diagram of an electronic device provided by an embodiment of the present application.

Referring to FIG. 7, an embodiment of the present application further provides an electronic device 200. The electronic device 200 includes at least one memory 210, at least one processor 220, and a bus 230 connecting different platform systems.

The memory 210 may include a readable medium in the form of a volatile memory, such as a Random Access Memory (RAM) 211 and/or a cache memory 212, and may further include a Read-Only Memory (ROM) 213.

The memory 210 also stores a computer program, where the computer program, when executed by the processor 220, causes the processor 220 to perform the steps of the memory state recovery method in the embodiment of the present application. The specific implementation method is consistent with that described in the embodiment of the above memory state recovery method in achieved technical effects, so some contents will not be repeated here.

The memory 210 may further include a utility tool 214 having at least one program module 215. Such program module 215 includes, but is not limited to: an operating system, one or more application programs, other program modules, and program data, each or some combinations of these examples may include the implementation of a network environment.

Correspondingly, the processor 220 may execute the above-mentioned computer program, and may execute the utility tool 214.

The bus 230 may represent one or more of several types of bus structures, including a memory bus or memory controller, a peripheral bus, a graphics acceleration port, a processor, or a local bus using any one of multiple bus structures.

The electronic device 200 may also communicate with one or more external devices 240 such as a keyboard, a pointing device, a Bluetooth device, etc., and may also communicate with one or more devices capable of interacting with the electronic device 200, and/or with any device (such as router, modem or the like) that enables the electronic device 200 to communicate with one or more other computing devices. This communication may be performed through an input/output interface 250. Furthermore, the electronic device 200 may also communicate with one or more networks (e.g., a local area network (LAN), a wide area network (WAN), and/or a public network, such as the Internet) through a network adapter 260. The network adapter 260 may communicate with other modules of the electronic device 200 through the bus 230. It should be understood that, although not shown in the figures, other hardware and/or software modules may be used in conjunction with the electronic device 200, including but not limited to: microcodes, device drivers, redundant processors, external disk drive arrays, RAID systems, tape drives, and data backup storage platforms.

An embodiment of the present application further provides a computer-readable storage medium configured to store a computer program. When the computer program is executed, the steps of the memory state recovery method in the embodiment of the present application are implemented. The specific implementation method is consistent with that described in the embodiment of the above memory state recovery method in achieved technical effects, so some contents will not be repeated here.

Figure 8:
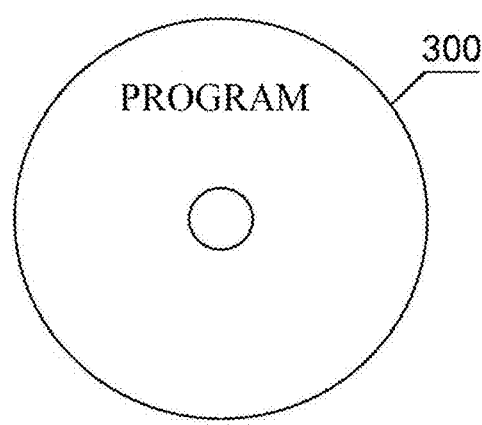
FIG. 8 is a structural schematic diagram of a program product for a memory state recovery method provided by an embodiment of the present application.

FIG. 8 shows a program product 300 for implementing the above memory state recovery method provided by this embodiment, which may adopt a portable Compact Disk Read-Only Memory (CD-ROM) and include a program code, and may run on a terminal device, such as a personal computer. However, the program product 300 of the present disclosure is not limited thereto. In the present application, the readable storage medium may be any tangible medium containing or storing a program, which may be used by or in combination with an instruction execution system, apparatus or device. The program product 300 may take the form of any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or any combination of the foregoing. More specific examples (non-exhaustive list) of the readable storage media include: an electrical connection having one or more wires, a portable disk, a hard disk, a Random Access Memory (RAM), a Read-Only Memory (ROM), an Erasable Programmable Read-Only Memory (EPROM or flash memory), an optical fiber, a portable Compact Disk Read-Only Memory (CD-ROM), an optical storage device, a magnetic storage device, or any suitable combination the foregoing.

The computer-readable storage medium may include a data signal propagated in baseband or as part of a carrier wave, in which a readable program code is carried. Such propagated data signal may take many forms, including but not limited to electromagnetic signals, optical signals, or any suitable combination of the foregoing. The readable storage medium may also be any readable medium that can transmit, propagate, or transport a program for use by or in connection with an instruction execution system, apparatus, or device. A program code contained in the readable storage medium may be transmitted using any appropriate medium, including but not limited to wireless, wired, optical cable, RF, etc., or any suitable combination of the foregoing. The program code for performing the operations of the present disclosure may be written in any combination of one or more programming languages including object-oriented programming languages such as Java, C++, etc., and conventional procedural programming languages, such as "C" language or similar programming languages. The program code may execute entirely on the user's computing device, partly on the user's device, as a stand-alone software package, partly on the user's computing device and partly on a remote computing device, or entirely on the remote computing device or server. In situations involving remote computing devices, the remote computing device may be connected to the user's computing device through any type of network, including a local area network (LAN) or a wide area network (WAN), or may be connected to an external computing device (for example, through the Internet using an Internet Service Provider).

The present application is elaborated from the perspectives of purpose of use, efficiency, progress and novelty, etc., and has complied with the functional enhancement and usage requirements emphasized by the Patent Law. The above specification and drawings of the present application are only the preferred embodiments of the present application and are not intended to limit the present application. Therefore, any structure, apparatus, feature, etc. that are similar or identical to those of the present application, that is, any equivalent substitution or modification made in accordance with the scope of the patent application, shall fall within the scope of patent application protection of the present application.

The invention claimed is:

1. A memory state recovery method for an MMU-free environment in an acceleration of CPU chip simulation, comprising following steps:
    Step S1: relocating Virtual Memory Areas (VMA), including: relocating each VMA in an available physical memory space, and converting a base address represented by a virtual address of the VMA into a physical address, wherein a length of the VMA remains unchanged;
    Step S2: recovering memory access data, wherein a recovery rule of a storage location for each read memory access record from the recovered memory access data is: the base address of the relocated VMA+offset;
    Step S3: recovering stack states, wherein a recovery rule of a storage location for each stack frame is: the base address of the relocated VMA+offset; and
    Step S4: recovering general register values.

2. The memory state recovery method for an MMU-free environment in the acceleration of CPU chip simulation of claim 1, wherein the step S1 comprises:
    Step S11: determining a starting address of a physical memory in a target system environment;

Step S12: taking an area starting from the starting address as an area of a stack type; and Step S13: taking an end of a previous area as a beginning of a next area, and allocating a heap type and a normal type in order.

3. The memory state recovery method for an MMU-free environment in the acceleration of CPU chip simulation of claim 1, wherein the step S2 comprises:

Step S21: in response to determining that a value from the memory access data belongs to the range of a certain original VMA, determining that the value is a memory address, and the value is: the base address of the relocated VMA+offset;

Step S22: in response to determining that the value from the memory access data is equal to a certain jump address, determining that the value is a memory address, and the value is an address of a corresponding symbol;

Step S23: in response to determining that the value from the memory access data does not belong to the range of a certain original VMA, and is not equal to a certain jump address, determining the value from the memory access data is a piece of normal data, and the value remains unchanged.

4. The memory state recovery method for an MMU-free environment in the acceleration of CPU chip simulation of claim 1, wherein the step S3 comprises:

Step S31: in response to determining that the stack frame is in a Return Address (RA) location, determining that a value of the stack frame is a jump address, and the value is an address of a corresponding symbol;

Step S32: in response to determining that the stack frame is in a Frame Pointer (FP) location, determining that the value of the stack frame is a VMA0 address, and the value is: a base address of the relocated VMA0+offset;

Step S33: in response to determining that the stack frame is in another location and the value of the stack frame belongs to the range of a certain original VMA, determining that the value is a memory address, and the value is: the base address of the relocated VMA+offset;

Step S34: in response to determining that the stack frame is in another location and the value of the stack frame is equal to a certain jump address, determining that the value is a memory address, and the value is: an address of a corresponding symbol;

Step S35: in response to determining that the stack frame is not in a Return Address (RA) location, is not in a Frame Pointer (FP) location, and the value of the stack frame does not belong to the range of a certain original VMA, and is not equal to a certain jump address, determining the value of the stack frame is a piece of normal data, and the value remains unchanged.

5. The memory state recovery method for an MMU-free environment in the acceleration of CPU chip simulation of claim 1, wherein the step S4 comprises:

Step S41: in response to determining that a value from the general register values belongs to the range of a certain original VMA, determining that the value is a memory address, and the value is: the base address of the relocated VMA+offset;

Step S42: in response to determining that the value from the general register values is equal to a certain jump address, determining that the value is a memory address, and the value is an address of a corresponding symbol;

Step S43: in response to determining that the value from the general register values does not belong to the range of a certain original CMA, and is not equal to a certain jump address, determining the value from the general register values is a piece of normal data, and the value remains unchanged.

6. A memory state recovery device for an MMU-free environment in the acceleration of CPU chip simulation, comprising:

a VMA relocation unit configured to relocate each VMA in an available physical memory space, and convert a base address represented by a virtual address of the VMA into a physical address, wherein a length of the VMA remains unchanged;

a memory access data recovery unit configured to recover memory access data, wherein a recovery rule of a storage location for each read memory access record from the recovered memory access data is: the base address of the relocated VMA+offset;

a stack state recovery unit configured to recover stack states, wherein a recovery rule of a storage location for each stack frame is: the base address of the relocated VMA+offset; and a general register value recovery unit configured to recover general register values.

7. An electronic device, comprising: a memory and a processor, wherein the memory stores a computer program, and the processor, in response to executing the computer program, implements the steps of the method of claim 1.

8. A non-transitory computer-readable storage medium storing a computer program, wherein the computer program, in response to being executed by a processor, causes the processor to implement the steps of the method of claim 1.

* * * * *